ELECTRICAL INPUT CIRCUIT WITH NOISE REDUCING MEANS

Filed Dec. 30, 1948

INVENTORS
William R. Ayres &
Daniel W. Martin
BY Morris A. Rabkin
ATTORNEY

Patented Aug. 10, 1954 2,686,270

UNITED STATES PATENT OFFICE 2,686,270

ELECTRICAL INPUT CIRCUIT WITH NOISE REDUCING MEANS

William R. Ayres, Oaklyn, and Daniel W. Martin, Blackwood, N. J., assignors to Radio Corporation of America, a corporation of Delaware Application December 30, 1948, Serial No. 68,274

2 Claims. (Cl. 307—89)

Figures 1, 2, 3:
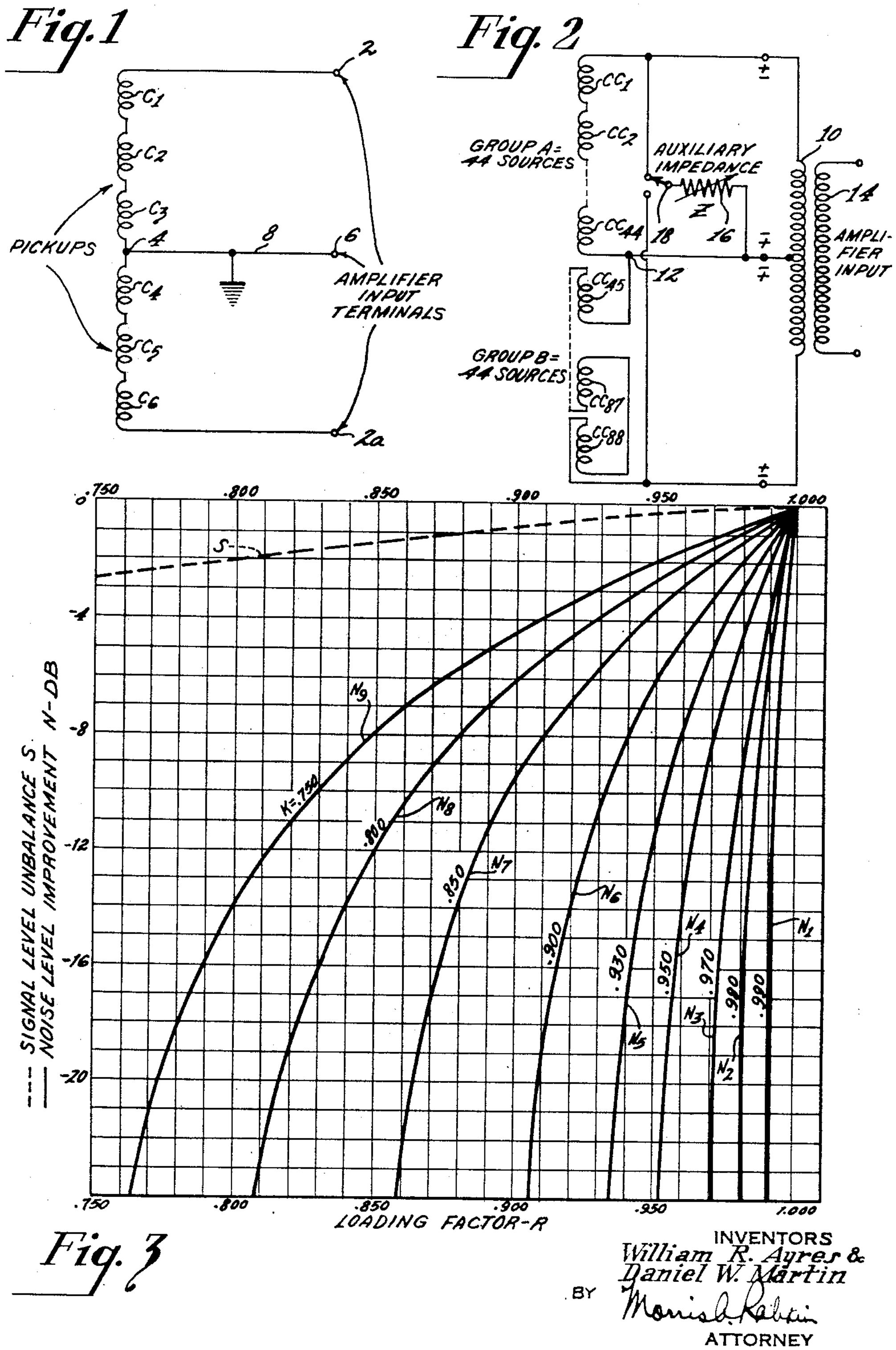

This invention relates generally to improvements in electrical input circuits. More particularly, it relates to improvements in such circuits which may include a plurality of signal sources into which undesired noise may be introduced by the presence of stray electrical fields or even by mechanical vibrations.

Stray electrical fields, for example, are usually present in the vicinity of various types of electrical apparatus such as transformers, motors, high frequency generators, etc., especially when these are imperfectly shielded. The normal operation of devices such as those which include a plurality of pickup units is affected by these stray fields to the extent that the quality of the output is severely impaired. This is usually due to the fact that the stray fields are not uniformly distributed and will almost always affect some pickups more than others.

One object of the invention is to provide an improved means for reducing the noise effects introduced by external energy fields, either electrical or mechanical, on the output of a plurality of signal sources.

Another object of the invention is to provide an improved means and method for reducing in electrical input circuits, which include a plurality of devices capable of picking up energy from external fields, noises which result from stray electromagnetic fields.

Another object of the invention is to provide an improved means and method for reducing the noise level in electrical input circuits which comprise a plurality of pickup units.

Another object of the invention is to provide an improved means and method for reducing the noise level in electrical input circuits comprising a plurality of pickup or detector units monitored by a common amplifier.

Still another object of the invention is to provide a means and method for reducing the noise level due to the presence of stray electromagnetic fields, in the input circuits of electronic musical instruments which include a plurality of electromagnetic pickups.

These and other objects will be more apparent and the invention will be more readily understood from the description set forth in the following specification, including the drawings of which, Fig. 1 is a schematic diagram of one embodiment of a circuit to which the present invention is applicable, Fig. 2 is a schematic diagram of the circuit of Fig. 1 modified to include means which may be utilized to accomplish the principal objects of the present invention, and Fig. 3 is a graph of the improvement in noise level as a function of the loading factor for different noise level ratios between two sets of pickup coils, that can be obtained by utilizing the methods and apparatus of the present invention.

Although applicable to various devices having an electrical input circuit including a plurality of electrical sources, the invention will be illustrated with reference to its application as a part of an electronic musical instrument such as a so-called electronic piano. In this type of instrument, various means have been shown in the past for achieving a degree of balance with regard to noise pickup from stray electromagnetic fields. For example, it is possible, where the sources have similar properties, to connect all the sources in series, then connect the combination to a balanced line, with a grounded center tap connected at the midpoint of the series combination. Such an arrangement is shown in Fig. 1. This figure is a schematic diagram of part of a signal input circuit of an electronic piano which may be of the type in which a separate electromagnetic pickup device is positioned at some point adjacent each metallic piano string tuned to a note of the musical scale. When a string is struck with its associated hammer, causing it to vibrate with the characteristic frequencies of its fundamental and overtones, the sound waves are translated into corresponding voltage variations by the pickup device. The voltage variations are amplified, usually by an amplifier common to all the pickups and the output of the amplifier is applied to a sound reproducer such as a loudspeaker.

The typical electrical input circuit shown in Fig. 1 comprises a number of pickup coils $C_1$ to $C_6$, representative of any number of coils, each of which may be associated with a different piano string. These coils are connected in a series arrangement, each end of the circuit being connected to amplifier input terminals 2 and 2*a* and the midpoint 4 of the series combination being connected to an amplifier terminal 6 through a grounded lead 8.

The two halves of the series combination should also be connected in such a manner that, in the common output circuit, the hum voltages due to the presence of stray external energy fields will be in phase opposition to each other. The signal voltages will not be in phase opposition, however, since the phases of these voltages will be random, due to the operator striking the keys in any desired order and combination. The coils may be connected in different types of groupings to obtain the desired phase relations between the hum voltages of the two groups. One of these is illustrated in Patent No. 2,258,241, issued October 10, 1941, to Galan W. Demuth. Here, every other coil is series connected in one group and the alternate coils are series connected in a second group with each group being connected to a separate transformer primary. The primaries are so connected that the hum voltages are in phase opposition. A somewhat different arrangement is shown in Patent No. 2,258,990, issued October 14, 1941, to E. S. Lundie. In the device described in this patent, the entire number of pickup coils is first divided into a number of subgroups with the individual members of each subgroup series connected and various subgroups also connected in two different series. Each of the two series is then connected to two transformer primaries such that their hum voltage is in phase opposition.

In designing practical instruments utilizing the above types of grouping of the pickups so as to have two similar groups connected in phase opposition, it has been observed that a perfect balance is still not obtained, because of variations in the strength of the stray electromagnetic field from one position to another. That is, the same source of stray field may produce more noise in one pickup coil than in another because of the difference in physical locations of the respective pickups with respect to the offending source. Phase differences between the two positions at audio frequencies are usually negligible within the usual dimensions of a piece of electronic equipment. This may be attributed to the high velocity of propagation of electromagnetic radiation.

As a more specific example, consider a system of pickup coils for an instrument such as previously described with reference to Fig. 1. As shown in Fig. 2, this may consist of a total of 88 coils divided into two equal groups, A and B. Coils $CC_1$ to $CC_{44}$ are series connected in group A and coils $CC_{45}$ to $CC_{88}$ are shown as series connected in group B. The extremes of both groups taken together may be connected to the ends of a transformer primary 10 while the midpoint 12 of the coils may be connected to the midpoint of the transformer primary. The secondary 14 of the transformer may be connected to the input of an amplifier (not shown). In order that the hum voltages from groups A and B will be in phase opposition in the output, the coil connections of group B may be reversed. That is, the top of one even numbered coil may be connected to the bottom of the next odd numbered coil and the top of one odd numbered coil may be connected to the bottom of the next even numbered coil.

If the sources of group A are, on the average, in positions of higher field intensity than those of group B, an unbalance will still be present and the noise level will be raised because of this condition. An improvement may be made, in accordance with the present invention, by connecting an impedance 16 in parallel with the group having the greater noise output, in this case, assumed to be group A. The group which has the higher noise level may, of course, be determined by simple measurement of the output voltage. The impedance, which may be in the form of a variable resistance, loads the coils of group A slightly, thereby reducing the noise output from this group enough to produce a balance with the signal from group B. In order to provide a means for loading either of the two groups of coils, depending upon which one exhibits the higher noise output, a switching means 18 is also provided so that the impedance 16 may be connected in parallel with either group.

Of course, the additional loading will lower not only the noise output but also the signal output of the group across which the impedance is connected. This is not detrimental, however, in electronic musical instruments of the type referred to since the noise levels of groups A and B will be nearly equal and only a slight percentage decrease of the larger is required to obtain noise balance.

The following analysis may be applied to the above described situation.

Let the initial signal values $A_s$ and $B_s$ be equal from the two halves A and B of the series combination, when all sources are energized in an equivalent manner.

Let $a>b$ where "$a$" and "$b$" are initial noise values from groups A and B, respectively, said noise being that resulting from stray external energy fields.

If "$a$" and $A_s$ are both reduced by a loading factor R (let $R=K$ for $Ka=b$, a condition of noise balance), then the signal level unbalance S (in db), i. e., the difference in signal level caused by the loading by the auxiliary impedance, will be:

$$S=20\log_{10}\frac{RA_s}{B_s}=20\log_{10}R \tag{1}$$

Loading factor R is a measure of the reduction in signal level that will accompany the loading of one of the groups A or B with an auxiliary impedance. It is expressed as the ratio of the signal voltage without the auxiliary impedance connected, divided by the signal voltage, with the auxiliary impedance connected.

K is the ratio of noise voltage of one group divided by noise voltage of the other group, the noise being that produced by an external electromagnetic disturbance.

The initial combined noise is $$a-b=a(1-K) \tag{2}$$

and the reduced noise is $$Ra-b=a(R-K) \tag{3}$$

giving a noise level improvement N of $$N=20\log_{10}\frac{(1-K)}{(R-K)} \tag{4}$$

In Fig. 3 are plotted curves of signal level unbalance S and noise level improvement N as functions of loading factor R, in that range of values of R for which there is a signal level unbalance of not greater than 2½ decibels. A signal level unbalance within this range, or at least of this order, will result in only negligible audible effect upon the total signal and, in addition, the balance between the components will hardly be affected. However, it is apparent from the curves which are shown that a large noise level improvement can be obtained at the expense of small signal level unbalances within this range. Curves $N_1$ to $N_9$ each show the noise level improvement in decibels as a function of loading factor R for selected values of K between .990 and .750. Curve S (broken line) shows the reduction in signal level which will be present when an auxiliary impedance is used such that the loading factor R is between .750 and 1.0.

As shown by curve $N_9$, when the noise amplitude of one group is only 75 per cent of the other, i. e., when $K=.750$, one can obtain 7 db noise level improvement using a loading factor of .860, and for these values the signal level unbalance will be less than 1.2 db. As shown by curve $N_6$, when the noise amplitude of one group is 90 percent of the other ($K=.900$) a noise level improvement of 14 db can be obtained, using a loading factor of .92. At this condition, the signal level unbalance will be only .75 db.

With the pickup coils connected according to a more nearly balanced system such as shown in the above mentioned Lundie patent, the signal level unbalance will be practically zero and the improvement in noise level is thus even more effective.

Although the invention has been illustrated as including a switching means for selecting the group of coils across which the auxiliary impedance is to be connected and a means for varying the value of the impedance, the most troublesome source of electromagnetic radiation may have predetermined characteristics. Where this condition exists, the auxiliary impedance may be given a suitable fixed value and a fixed connection with one or the other of the groups of coils.

Although the modification of the invention described above is the preferred form because of its general simplicity, it is also possible, in some cases, to connect the auxiliary impedance in parallel with only a portion of the total number of signal sources in any one group. This would be desirable, for example, when the stray energy field was affecting only a localized portion of a relatively large number of pickups.

There has thus been described a method and means for reducing noise due to stray external energy fields in a device which includes a plurality of signal generators. These generators may be of any commonly known type such as a motor-generator for producing relatively high amperage direct or alternating currents, an electrical vibrator, oscillator, etc. All of the generators should, of course, be located within a finite compass such that external energy fields affect them to varying extents relative to each other.

We claim:

1. In an electrical input circuit having a plurality of electromagnetic pickup coils responsive to stray electromagnetic fields, said coils being series connected in two different groups having an equal number of said coils, said groups having their outputs connected to a common output circuit so that noise voltages induced into said coils by said stray magnetic fields are in phase opposition therein, said stray electromagnetic fields inducing a greater noise voltage into the first said coil group than into the second by virtue of said stray fields being closer to said first coil group, the improvement which comprises connecting an auxiliary impedance in parallel with said first coil group to provide for reduced pickup sensitivity thereof and correspondingly reducing said noise voltage induced therein to the value of the noise voltage induced into said second group of coils and permitting said noise voltages induced into each of said coil groups to cancel in said output circuit.

2. The improvement in an electrical input circuit according to claim 1 wherein said impedance is variable.

References Cited in the file of this patent

UNITED STATES PATENTS

| Number | Name | Date |
|---|---|---|
| 2,258,241 | Demuth | Oct. 7, 1941 |
| 2,258,990 | Lundie | Oct. 14, 1941 |
| 2,272,452 | Whittle | Feb. 10, 1942 |
| 2,275,309 | Norton | Mar. 3, 1942 |
| 2,381,097 | Adams | Aug. 7, 1945 |
| 2,396,531 | Reiskind et al. | Mar. 12, 1946 |
| 2,416,082 | Balmer | Feb. 18, 1947 |
| 2,417,097 | Warshaw | Mar. 11, 1947 |
| 2,424,772 | Rieber | July 29, 1947 |